United States Patent [19]
Santacatterina

[11] Patent Number: 5,216,893
[45] Date of Patent: Jun. 8, 1993

[54] DEVICE FOR CONTROLLING THE OPERATION OF A REFRIGERATION APPLIANCE, SUCH AS A DOMESTIC REFRIGERATOR, A FREEZER OR THE LIKE

[75] Inventor: Giampiero Santacatterina, Sangiano, Italy

[73] Assignee: Whirlpool International B.V., Veldhoven, Netherlands

[21] Appl. No.: 782,047

[22] Filed: Oct. 24, 1991

[30] Foreign Application Priority Data

Oct. 30, 1990 [IT] Italy .................. 21924 A/90

[51] Int. Cl.$^5$ ............................................. F25B 49/00
[52] U.S. Cl. .......................................... 62/127; 236/94; 340/309.4
[58] Field of Search ........... 340/309.4, 870.17, 870.38; 62/127; 236/94

[56] References Cited

U.S. PATENT DOCUMENTS

| | | | |
|---|---|---|---|
| 4,325,223 | 4/1982 | Cantley | 62/127 X |
| 4,823,290 | 4/1989 | Fasack et al. | 340/870.17 X |
| 4,970,496 | 11/1990 | Kirkpatrick | 62/127 X |

*Primary Examiner*—William E. Wayner
*Attorney, Agent, or Firm*—Thomas J. Roth; Stephen D. Krefman; Thomas E. Turcotte

[57] ABSTRACT

A device for controlling the operation of a refrigeration appliance such as a domestic refrigerator consists of a circuit (2) comprising a plurality of resistive elements (3, 4, 5, 6) for generating reference signals ($V_A$) to be compared in a comparator (18) with analog signals ($V_R$) originating from a plurality of temperature sensors (21). The resistors have adjustable characteristics and are activated sequentially by a sequencer circuit (16) which also controls the supply of data ($V_C$) derived from said comparisons into a memory (26, 27, 28). The sequencer circuit is connected to a control unit (35) for controlling the refrigeration appliance. The control unit reads the data from the memory at the end of each sequence of comparisons between the reference signals ($V_A$) and the signal ($V_R$) from the sensors, and on the basis of the data read out operate on the usual components (42, 43, 44) of the refrigeration appliance which generate and control its temperature.

13 Claims, 1 Drawing Sheet

DEVICE FOR CONTROLLING THE OPERATION OF A REFRIGERATION APPLIANCE, SUCH AS A DOMESTIC REFRIGERATOR, A FREEZER OR THE LIKE

DESCRIPTION

This invention relates to a refrigeration appliance such as a domestic refrigerator, a freezer or the like, of the type comprising usual components for reducing and controlling its internal temperature, such as a compressor, a thermostat, a usual indicator for indicating malfunction of the refrigeration appliance, and sensor means for generating information relating to the operation thereof.

Various devices for controlling the operation of a refrigeration appliance of the aforesaid type are known.

Although offering good performance, these devices suffer from the serious drawback that they cannot be modified once designed and fitted to a particular refrigeration appliance, for example a refrigerator.

In this respect, said devices are designed and constructed on the basis of the performance required of the refrigerator, and can be used only for this or for similar refrigerators.

This imposes on the manufacturer the need to stock a large number of such devices in order to be able to always satisfy market requirements and in particular all the possible variations in the type of refrigerator demanded by the user.

Furthermore, known devices comprise a relatively large number of components and are therefore of high cost, this also applying to their maintenance.

An object of the invention is therefore to provide a device for controlling the operation of refrigeration appliances which can be easily adapted to the different types of commercially available refrigerators, freezers and the like, and thus satisfy a very wide range of different possible requirements by the user. A particular object of the invention is to provide devices of the aforesaid type which can be easily modified and adapted to suit the various types of refrigeration appliances and which comprise only a small number of components, enabling the manufacturer to standardize the production of such devices as far as possible, and to facilitate and simplify their handling in the place in which they are stocked while awaiting fitting to the refrigeration appliance.

A further object is to provide a device which is of low cost in terms of its manufacture and its maintenance.

A further object is to provide a device of the aforesaid type which is reliable and is easily fitted to the refrigeration appliance.

These and further objects which will be apparent to the expert of the art are attained by a refrigeration appliance of the aforesaid type incorporating a device for controlling its operation which is characterised by incorporating a circuit comprising:

a) generator means for generating reference signals to be compared with analogous signals originating from sensor means, said generator means being of adjustable characteristics and being sequentially enabled to generate said reference signals by sequencer means;

b) comparator means arranged to compare said reference signals with those originating from the sensor means and to generate comparison signals to be fed to memory means, these latter being controlled and enabled to sequentially receive said comparison signals by the sequencer means; and c) control means arranged to read the data present in the memory means at the end of each sequence of storing said comparison signals in said memory means, said control means on the basis of this reading acting on the components which reduce and control the internal temperature of the refrigeration appliance to optimize the operation of this latter.

The present invention will be more apparent from the accompanying drawing, which is provided by way of non-limiting example and in which.

Figure 1:
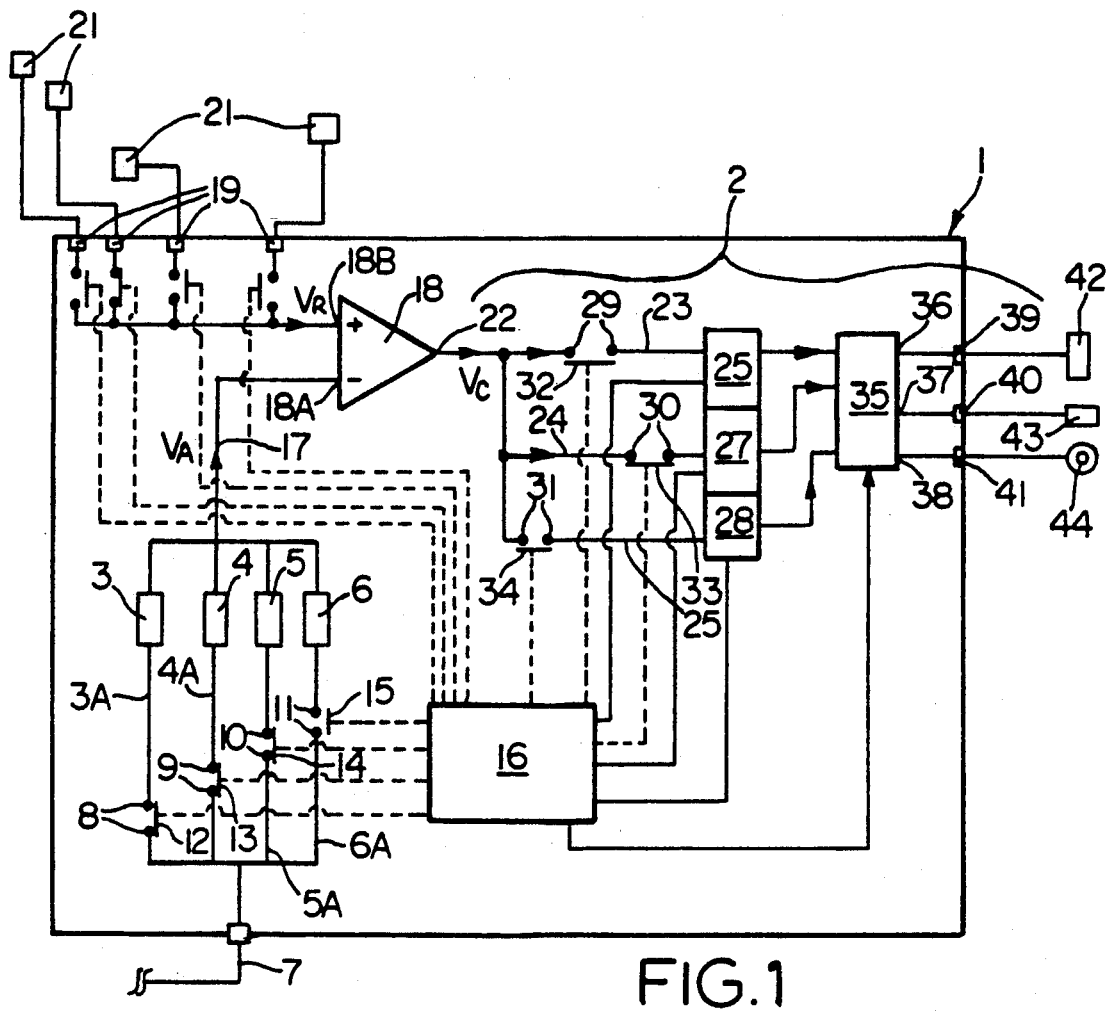
FIG. 1 is a schematic view of the device according to the invention.

With reference to said figures, the device of the invention, to be incorporated into a refrigeration appliance, comprises a card or support 1 holding a circuit 2 comprising a plurality of resistive elements 3, 4, 5 and 6 removably fitted to the card 1 and connected to a common power supply 7 via corresponding lines 3A, 4A, 5A, 6A.

These lines contain respective contacts 8, 9, 10 and 11 with which corresponding contactors 12, 13, 14, 15 cooperate under the control of a usual sequencer element 16 such as an electronic timer or a similar electrical member (selector, relay, two-way switch, etc.)

The resistive elements 3, 4, 5 and 6 are connected to a line 17 terminating at the inverting input 18A of at least one comparator 18, the non-inverting input 18B of which is connected to at least one connector 19 (four in the figure) to which a corresponding probe positioned within the reference, such as a temperature probe 21 (four in the figure) can be connected.

The output 22 of the comparator 19 is connected to branches 23, 24, 25 terminating in memory cells (for example three in number) 26, 27 and 28. Said branches incorporate contacts 29, 30, 31 arranged to cooperate, but not simultaneously, with contactors 23, 33 and 34 controlled by the sequencer 16.

The memory cells 26, 27 and 28 are connected to a control unit 35, advantageously a microprocessor, the outputs 36, 37, 38 of which are connected to connectors 39, 40 and 41 which enable the unit 35 to be connected for example to a usual motor-driven compressor 42, a thermostat 43, and an alarm device 44 (of known type) to indicate a malfunction of the refrigeration appliance.

The described device is used as follows.

The board 1 is provided with resistive elements 3, 4, 5 and 6 of such values that their signals when fed to the comparator 18 can be compared with analogous signals originating from the probes 21 to enable the operation of the refrigeration appliance to be controlled and maintained within predefined limits on the basis of this comparison.

After connecting said elements 3, 4, 5 and 6 to the board 1, the circuit 2 is powered in known manner.

Following this, the sequencer 16 closes the contacts 8, 9, 10 and 11 sequentially, to thus power the elements 3, 4, 5 and 6 one after another. Signals $V_A$ are thus fed from these latter to the comparator 18. This latter also receives in a suitable sequence signals $V_E$ generated by the probes 21.

The comparator 18 compares the signals $V_A$ (considered as reference signals) with the signals $V_E$ originating from the different resistive elements and probes in turn; in this manner it generates a sequence of signals $V_C$ which are fed to and stored in the memories 26, 27 and 28 by sequential closure of the contacts 29, 30, 31 contained in the branches 23, 24, 25 which connect these memories to said comparator 18.

Each memory therefore receives data or signals $V_C$ regarding particular situations determined by the probes 21 within the refrigeration appliance.

At the end of each sequence of storage within said memories, the sequencer 16 senses that they contain a corresponding data item $V_C$ and enables the unit 35 to simultaneously read the contents of said memories.

This unit therefore reads the succession of said memorized data and generates signals at its outputs 36, 37 and 38 in accordance with a suitable comparison algorithm.

If the memorized data succession does not indicate that the operation of the refrigeration appliance is as desired, these signals modify the state of the compressor 42 or thermostat 43 or activate the alarm device 44.

As stated, the value or characteristic of each resistive element 3, 4, 5 and 6 is chosen on the basis of the comparison which the comparator 18 is to make between the signals $V_A$ and $V_E$.

In particular, by changing said values the output signals $V_C$ from the comparator 18 are modified, so changing the manner in which the unit 35 acts on the usual components 42, 43 and 44 of the refrigeration appliance.

A circuit has been described in which the elements generating the signal $V_A$ are resistive elements. However, as is obvious, other electrical or electronic components can be used for this purpose. In particular, a programmable device can be provided which sequentially generates signals $V_A$ having a value which suits the particular operating requirements of the refrigeration appliance. In this latter case the sequencer 16 is incorporated into said programmable device.

In addition the components such as the sequencer 16, the comparator 18, the memories 26, 27, 28 and the unit 35 can be incorporated totally or partly into a microprocessor circuit or an application-specific integrated circuit (ASIC) of known type. In this case only two elements will be visible on the card 1, namely said microprocessor circuit (or ASIC) and the element or elements generating the signal or signals $V_A$.

Finally, as a further obvious alternative, each element generating the signal $V_A$ and the corresponding probe 21 can be connected to a comparator 18.

In this case the circuit 2 comprises (see FIG. 2) a plurality of comparators 18 connected to said memory cells in a manner similar to that already described.

Figure 2:
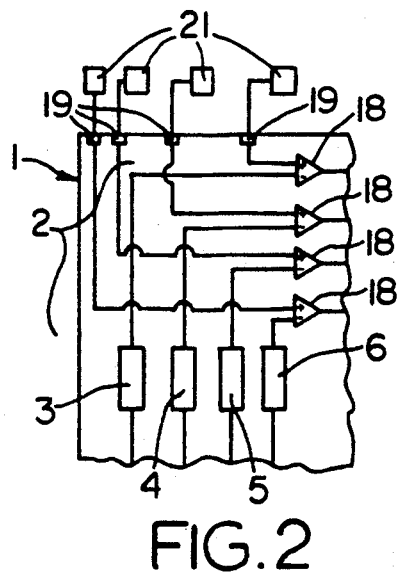
FIG. 2 is a modification of the device of FIG. 1.

In this latter case, the operation of the circuit 2 of FIG. 2 is similar to that already described and will therefore not be further considered.

The device according to the invention makes it possible in a simple and rapid manner to act on those components of a refrigeration appliance which generate and maintain a low temperature in its interior in accordance with the characteristics which the refrigeration appliance must satisfy to comply with market requirements.

The device is also reliable, of simple construction and easy to fit to the refrigeration appliance.

I claim:

1. In a device for controlling the operation of a refrigeration appliance of the type comprising components for reducing and controlling its internal temperature, a thermostat, an indicator for indicating a malfunction of the refrigeration appliance, and sensor means for generating information relating to the operation thereof, the improvement comprising:

a) generator means for generating reference signals ($V_A$) to be compared with analog signals ($V_R$) originating from the sensor means, said generator means being of adjustable characteristics and being sequentially enabled to generate said reference signals by sequencer means;

b) comparator means connected to compare said reference signals with said analog signals originating from the sensor means so as to generate comparison signals to be fed to memory means, said memory means being controlled and enabled by the sequencer means to sequentially receive said comparison signals; and c) control means arranged to read data present in the memory means at the end of each sequence of storing said comparison signals, said control means being responsive to said memory data to control the components of the refrigeration appliance which reduce and control the internal temperature of the refrigeration appliance so as to optimize its operation.

2. A device as claimed in claim 1, wherein the means for generating the reference signals comprise at least one resistive element removably associated with a support for a circuit that includes said generator means, said comparator means, said sequencer means, said memory means, and said control means.

3. A device as claimed in claim 1, wherein the means for generating the reference signals comprise at least one programmable member.

4. A device as claimed in claim 1, wherein the sequencer means comprise a timer member.

5. A device as claimed in claim 3, wherein the sequencer means are incorporated into the programmable member which generates the reference signals.

6. A device as claimed in claim 4, wherein the generator means comprise resistive elements and the timer member controls contractors arranged to sequentially close contacts contained in power lines to the resistive elements.

7. A device as claimed in claim 1, wherein the sequencer means control contactors connected sequentially close contacts contained in lines which connect the memory means to the comparator means.

8. A device as claimed in claim 7, characterised in that the sequencer means are connected to the control means.

9. A device as claimed in claim 1, wherein the comparator means include a comparison member connected to the generator means and to the sensor means.

10. A device as claimed in claim 1, wherein the sensor means include a plurality of probes and the comparator means comprise a plurality of comparison means connected to corresponding generator means and probes.

11. A device as claimed in claim 1, wherein the control means comprise a micro processor type control unit.

12. A device as claimed in claim 1, wherein at least a part of the control means, comparator means, sequencer means and memory means are incorporated into a microprocessor circuit.

13. A device as claimed in claim 1, wherein the control means include an application-specific integrated circuit (ASIC), said integrated circuit containing at least a part of the control means, comparator means, sequencer means and memory means.

* * * * *